(12) United States Patent
Tachifuji

(10) Patent No.: US 9,346,683 B2
(45) Date of Patent: May 24, 2016

(54) CARBONATE RADICAL-CONTAINING MAGNESIUM HYDROXIDE PARTICLE AND MANUFACTURING METHOD THEREOF

(75) Inventor: Tomoko Tachifuji, Sakaide (JP)

(73) Assignee: KYOWA CHEMICAL INDUSTRY CO., LTD., Kagawa (JP)

( * ) Notice: Subject to any disclaimer, the term of this patent is extended or adjusted under 35 U.S.C. 154(b) by 1180 days.

(21) Appl. No.: 12/450,610

(22) PCT Filed: Mar. 27, 2008

(86) PCT No.: PCT/JP2008/056630
§ 371 (c)(1),
(2), (4) Date: Oct. 2, 2009

(87) PCT Pub. No.: WO2008/123566
PCT Pub. Date: Oct. 16, 2008

(65) Prior Publication Data
US 2010/0098781 A1    Apr. 22, 2010

(30) Foreign Application Priority Data
Apr. 2, 2007  (JP) ................................ 2007-096013

(51) Int. Cl.
| | |
|---|---|
| *A61K 33/10* | (2006.01) |
| *C09K 21/02* | (2006.01) |
| *C09K 3/00* | (2006.01) |
| *C01F 5/14* | (2006.01) |
| *C01F 5/08* | (2006.01) |
| *C01F 5/22* | (2006.01) |
| *C01F 5/24* | (2006.01) |

(52) U.S. Cl.
CPC ... *C01F 5/14* (2013.01); *C01F 5/08* (2013.01); *C01F 5/22* (2013.01); *C01F 5/24* (2013.01); *C01P 2002/72* (2013.01); *C01P 2002/88* (2013.01); *C01P 2006/12* (2013.01)

(58) Field of Classification Search
None
See application file for complete search history.

(56) References Cited

U.S. PATENT DOCUMENTS

| 4,505,887 A * | 3/1985 | Miyata et al. | 423/635 |
| 2003/0235693 A1 * | 12/2003 | Oishi et al. | 428/422.8 |

FOREIGN PATENT DOCUMENTS

| CA | 1 140 730 | 2/1983 |
| DE | 29 14 662 | 10/1980 |
| DE | 103 04 314 | 8/2004 |
| JP | 57-35126 | 7/1982 |

(Continued)

OTHER PUBLICATIONS

S. Ardizzone et al., "Acid/base and surface features of pure phase magnesia powders", Colloids and Surfaces A, pp. 9-17, Dec. 20, 1998.
English translation of the International Preliminary Report on Patentability.

(Continued)

*Primary Examiner* — Colin W Slifka
(74) *Attorney, Agent, or Firm* — Wenderoth, Lind & Ponack, L.L.P.

(57) ABSTRACT

A magnesium hydroxide particle having a BET specific surface area of 80 m²/g or more and a manufacturing method thereof.
The magnesium hydroxide particle has a BET specific surface area of 80 to 400 m²/g and is represented by the following formula (1):

$$Mg(OH)_{2-x}(CO_3)_{0.5x} \cdot mH_2O \qquad (1)$$

wherein x and m satisfy the following conditions:

$0.02 \le x \le 0.7$, $0 \le m \le 1$.

6 Claims, 3 Drawing Sheets

(56) References Cited

FOREIGN PATENT DOCUMENTS

| | | |
|---|---|---|
| JP | 2-111625 | 4/1990 |
| JP | 3-97618 | 4/1991 |
| JP | 3048255 | 3/2000 |
| JP | 2003-40616 | 2/2003 |
| JP | 2003-306325 | 10/2003 |
| JP | 2007-22902 | 2/2007 |
| SU | 1404459 | 6/1988 |

OTHER PUBLICATIONS

Supplementary European Search Report issued Apr. 14, 2014 in European Application No. 08739740.2.
Database WPI, Thomson Scientific, London, GB, Jun. 23, 1988, XP-002722606.
A. Botha et al., "Preparation of a magnesium hydroxy carbonate from magnesium hydroxide", Hydrometallurgy, 2001, vol. 62, No. 3, pp. 175-183.

* cited by examiner

CARBONATE RADICAL-CONTAINING MAGNESIUM HYDROXIDE PARTICLE AND MANUFACTURING METHOD THEREOF

This application is a U.S. national stage of International Application No. PCT/JP2008/056630 filed Mar. 27, 2008.

TECHNICAL FIELD

The present invention relates to a magnesium hydroxide particle which is synthesized in the presence of a $CO_3$ ion and has a large BET specific surface area and to a manufacturing method thereof.

BACKGROUND OF THE ART

Magnesium hydroxide particles have been known for a long time and are used for medical, industrial and agricultural products in a wide variety of fields. For example, the medical products include an antacid and a lapactic and the industrial products include a flame retardant, soot desulfurizer, waste water neutralizer, ceramic raw material and sintering aid. The agricultural products include a magnesium fertilizer which neutralizes acid soil or supplies minerals.

A typical method of manufacturing the magnesium hydroxide particles is a seawater method in which seawater and slaked lime are reacted with each other. However, as about 0.1 g/L of a $CO_3$ ion in terms of $CO_2$ is contained in the seawater, when slaked lime is added without a pretreatment, $CaCO_3$ is formed and contained in the particles as an impurity. Then, seawater is generally decarbonized before it is used in a reaction. Other methods of manufacturing the magnesium hydroxide particles include one in which bittern as an Mg source and caustic soda as an alkali source are reacted with each other, one in which MgO is neutralized, and one in which a magnesium salt and ammonia are reacted with each other to crystallize magnesium hydroxide. In these prior art methods of manufacturing magnesium hydroxide, the $CO_3$ ion which forms an impurity such as $CaCO_3$ or $MgCO_3$ is undesired and tends to be excluded from a reaction system as much as possible.

Meanwhile, magnesium carbonate is manufactured by a soda ash method in which a magnesium salt solution and sodium carbonate are reacted with each other, an ammonium carbonate method in which a magnesium salt solution and an ammonium carbonate solution are reacted with each other, and a carbonic dioxide gas method in which a carbonic dioxide gas is caused to act on magnesium hydroxide. Since these methods are aimed to obtain magnesium carbonate, a large amount of the $CO_3$ ion is injected and the final product is represented by the chemical formula $(3-5)MgCO_3 \cdot Mg(OH)_2 \cdot (3-7)H_2O$, shows an X-ray diffraction image specific to basic magnesium carbonate, which differs from that of magnesium hydroxide, and has a BET specific surface area of not more than 80 m²/g.

Patent document 1 discloses a method of manufacturing a magnesium hydroxide particle having a large specific surface area by heating magnesium hydroxide and amorphous silicic acid in an aqueous medium to form magnesium silicate on the surface of a magnesium hydroxide particle. However, the reason that the specific surface area of the magnesium hydroxide particle obtained by this manufacturing method is large is assumed to be the influence of both magnesium silicate formed only on the surface and amorphous silicic acid which seems to remain unreacted partially. It is hard to say that the specific surface area of the magnesium hydroxide particle becomes large.

(patent document 1) JP-A 2003-40616

DISCLOSURE OF THE INVENTION

It is an object of the present invention to provide a magnesium hydroxide particle having a large BET specific surface area and a manufacturing method thereof. It is another object of the present invention to provide a baked product having a large BET specific surface area obtained by baking the above magnesium hydroxide particle.

The inventors of the present invention had an idea that a magnesium hydroxide particle having a large BET specific surface area might be obtained by adding a divalent anion which impedes the crystal growth of a magnesium hydroxide particle in the process of forming the magnesium hydroxide particle. When a magnesium salt solution and an alkali substance were reacted with each other in the presence of a $CO_3$ ion based on this idea, it was found that a magnesium hydroxide particle having a larger BET specific surface area than that of the prior art could be obtained. The present invention was accomplished based on this finding.

That is, according to the present invention, there is provided a magnesium hydroxide particle which has a BET specific surface area of 80 to 400 m²/g and is represented by the following formula (1).

$$Mg(OH)_{2-x}(CO_3)_{0.5x} \cdot mH_2O \qquad (1)$$

wherein x and m satisfy the following conditions:

$0 \leq m \leq 1$

According to the present invention, there is provided a method of manufacturing a magnesium hydroxide particle represented by the following formula (1) by contacting an Mg ion to an OH ion in water in the presence of a $CO_3$ ion:

$$Mg(OH)_{2-x}(CO_3)_{0.5x} \cdot mH_2O \qquad (1)$$

wherein x and m satisfy the following conditions:

$0 \leq m \leq 1$.

Further, according to the present invention, there is provided a baked product obtained by baking the above magnesium hydroxide particle at 400° C. or higher.

The present invention will be described in detail hereinunder.

BEST MODE FOR CARRYING OUT THE INVENTION

<Magnesium Hydroxide Particle>

Figure 1:
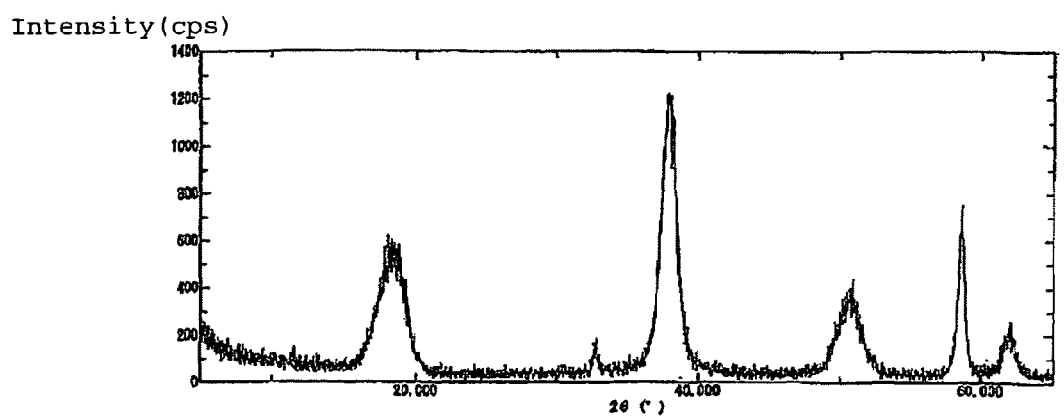
FIG. 1 is an X-ray diffraction image of a magnesium hydroxide particle obtained in Example 6.

The magnesium hydroxide particle of the present invention has composition represented by the following formula (1).

$$Mg(OH)_{2-x}(CO_3)_{0.5x} \cdot mH_2O \quad (1)$$

In the above formula, x satisfies 0.02≤x≤0.7. X satisfies preferably 0.04≤x≤0.6, more preferably 0.06≤x≤0.3.

In the formula, m satisfies 0≤m≤1. m preferably satisfies 0≤m≤0.5.

(Bet Specific Surface Area)

The BET specific surface area of the magnesium hydroxide particle of the present invention is 80 to 400 m²/g. The lower limit of BET specific surface area of the magnesium hydroxide particle of the present invention is 80 m²/g, preferably 100 m²/g, more preferably 120 m²/g. The upper limit of BET specific surface area is 400 m²/g, preferably 350 m²/g, more preferably 300 m²/g. The BET specific surface area of the magnesium hydroxide particle of the present invention is preferably 80 to 350 m²/g.

Although the magnesium hydroxide particle of the present invention contains about 0.75 to 23 wt % of a $CO_3$ ion in terms of $CO_2$, it shows characteristic properties specific to magnesium hydroxide in its X-ray diffraction image and differential thermal analysis (DTA) and has a BET specific surface area of 80 to 400 m²/g. As the content of the $CO_3$ ion increases, the crystal growth of the magnesium hydroxide particle is impeded more and the BET specific surface area of the obtained magnesium hydroxide particle becomes larger. However, when the content of $CO_2$ exceeds 23 wt %, the formation of magnesium carbonate is confirmed by the X-ray diffraction image and differential thermal analysis (DTA) and the $CO_3$ ion serves to grow the crystal of magnesium carbonate, thereby reducing the BET specific surface area disadvantageously.

<Baked Product>

The present invention includes a baked product obtained by baking the above magnesium hydroxide particle at 400° C. or higher. Since the magnesium hydroxide particle of the present invention has a slightly lower decomposition temperature than that of the magnesium hydroxide particle of the prior art, magnesium oxide is obtained at a temperature of 370° C. or higher. However, the baking temperature is preferably 400° C. or higher from the viewpoint of the stability of magnesium oxide.

<Method of Manufacturing Magnesium Hydroxide Particle>

The magnesium hydroxide particle of the present invention can be manufactured by contacting an Mg ion to an OH ion in water in the presence of a $CO_3$ ion.

(Mg Ion)

In the manufacturing method of the present invention, the Mg ion is preferably used in the form of an aqueous solution of a magnesium salt. Examples of the magnesium salt include magnesium chloride (including bittern from which Ca has been removed), magnesium sulfate, magnesium nitrate and magnesium acetate.

Since the $CO_3$ ion is added to impede the crystal growth of the magnesium hydroxide particle in the present invention, the aqueous solution of a magnesium salt preferably does not contain a Ca ion as much as possible. When the Ca ion is existent in a reaction system, it reacts with the $CO_3$ ion which has been added to impede the crystal growth of the magnesium hydroxide particle to form $CaCO_3$. Since an $SO_4$ ion which is a divalent anion has the function of impeding the crystal growth of the magnesium hydroxide particle like the $CO_3$ ion, when the aqueous solution of a magnesium salt is an aqueous solution of magnesium sulfate and only caustic soda and the aqueous solution of magnesium sulfate are reacted with each other, a magnesium hydroxide particle having a relatively large specific surface area is obtained. However, when the $CO_3$ ion is added, the specific surface area can be significantly made large.

(OH Ion)

In the manufacturing method of the present invention, the OH ion is preferably used in the form of an aqueous solution of an alkali metal hydroxide or ammonium hydroxide. The alkali metal hydroxide is preferably caustic soda.

($CO_3$ Ion)

In the manufacturing method of the present invention, the $CO_3$ ion can be supplied in the form of an aqueous solution of a carbonate such as alkali metal carbonate or ammonium carbonate, or $CO_2$ gas. It is preferably an aqueous solution of a carbonate to control the abundance ratio of the OH ion to the $CO_3$ ion.

In the manufacturing method of the present invention, it is preferred that an aqueous solution of a magnesium salt and an aqueous solution of an alkali metal hydroxide should be contacted to each other in the presence of an alkali metal carbonate.

(OH Ion/$CO_3$ Ion)

In the manufacturing method of the present invention, the abundance ratio of the OH ion to the $CO_3$ ion is important at the time of a reaction. This is because the chemical composition of the magnesium hydroxide particle of the present invention is determined by the abundance ratio of the OH ion to the $CO_3$ ion. When the amount of the $CO_3$ ion is large, magnesium carbonate is formed as a matter of course, its existence is confirmed by an X-ray diffraction image and differential thermal analysis (DTA), and the specific surface area of the formed magnesium hydroxide particle decreases. According to studies conducted by the inventors of the present invention, it was found that when the molar ratio of 2 (OH) to $CO_3$ is 99:1 to 65:35, the specific surface area of the magnesium hydroxide particle is large and the feature of the magnesium hydroxide particle is obtained in the D-ray diffraction image and differential thermal analysis (DTA). The molar ratio of 2 (OH) to $CO_3$ is preferably 98:2 to 70:30, more preferably 97:3 to 75:25.

Since the $CO_3$ ion is introduced for the formation of the magnesium hydroxide particle together with the OH ion to impede the crystal growth of the magnesium hydroxide particle, even when the $CO_3$ ion is added after the magnesium hydroxide particle is formed, the magnesium hydroxide particle having a large specific surface area of the present invention cannot be obtained. Therefore, it is important to supply the OH ion and the $CO_3$ ion stably in a fixed ratio. To this end, it is preferred to prepare a mixed solution of the OH ion and the $CO_3$ ion and use it in a reaction. Examples of the mixed solution of the OH ion and the $CO_3$ ion include a mixed aqueous solution of caustic soda and sodium carbonate and a mixed aqueous solution of ammonia and ammonium carbonate, out of which a mixed aqueous solution of caustic soda and sodium carbonate is preferred from the viewpoint of the yield of the magnesium hydroxide particle.

The magnesium hydroxide particle of the present invention is obtained even when the OH ion and the $CO_2$ gas are continuously poured into an aqueous solution of a magnesium salt at the same time under agitation. In this case, it is important that the abundance ratio of the OH ion and the $CO_3$ ion in a reaction system should be maintained at a constant value by controlling the concentration and flow rate of the $CO_2$ gas.

(Reaction Temperature)

The reaction temperature is preferably 0 to 100° C., more preferably 10 to 80° C.

(Reaction Time)

The reaction time is preferably 120 minutes or less, more preferably 60 minutes or less.

(Reaction Style)

The magnesium hydroxide particle of the present invention can be manufactured, for example, through a continuous stirred tank reaction in which an aqueous solution of a magnesium salt (Mg ion) and a mixed aqueous solution of caustic soda (OH ion) and sodium carbonate ($CO_3$ ion) are continuously supplied into a reactor and the product is continuously extracted from the reactor. The residence time in this reaction is preferably 120 minutes or less, more preferably 60 minutes or less.

It can also be manufactured through a batch reaction in which a mixed aqueous solution of caustic soda (OH ion) and sodium carbonate ($CO_3$ ion) is added to an aqueous solution of a magnesium salt (Mg ion) in a reactor.

(Alkali Cleaning)

When magnesium chloride (including bittern from which Ca has been removed) or magnesium sulfate is used as the aqueous solution of a magnesium salt as a raw material, a magnesium hydroxide particle obtained through a reaction may contain an Cl ion or an $SO_4$ ion as an impurity. The content of the Cl ion is preferably 0.5 wt % or less, more preferably 0.3 wt % or less. The content of the $SO_4$ ion is preferably 2 wt % or less, more preferably 1.5 wt % or less.

When a low total content of the above impurities is preferred according to the use of the magnesium hydroxide particle, the magnesium hydroxide particle obtained through the reaction is further cleaned by emulsification or with an alkali diluted aqueous solution to reduce the total content of the impurities by half or more. The alkali diluted aqueous solution for cleaning is preferably a caustic soda diluted aqueous solution or a sodium carbonate diluted aqueous solution. Although the total content of the impurities can be reduced by heating, when the magnesium hydroxide particle is aged by heating, its specific surface area which is the feature of the present invention decreases.

The magnesium hydroxide particle of the present invention has excellent filterability even though it has a large BET specific surface area. This is assumed to be because the diameter of an agglomerated secondary particle becomes larger than that of the conventional magnesium hydroxide particle which is synthesized without adding the $CO_3$ ion. This makes it possible to carry out the dehydration and cleaning of reaction slurry quickly and easily.

(Filtration, Dehydration, Drying, Grinding)

It is preferred that the slurry product obtained by the reaction should be filtered and then the filtrate should be cleaned with water or an alkali diluted aqueous solution and dried. Drying can be carried out by shelf type hot air drying or spray drying. In this case, drying is preferably carried out at 80 to 250° C. to remove water. Also, the filtrate can be vacuum dried without heating by substituting water with an organic solvent. Since products obtained by shelf type hot air drying and vacuum drying are blocks, they are preferably ground to be powdered in accordance with their use purposes.

EXAMPLES

The following examples are provided to further illustrate the present invention.

Example 1

6.67 L of bittern refined by removing Ca and having a concentration of 1.5 mol/L and 6.40 L of an alkali mixed solution of caustic soda and sodium carbonate ($2NaOH:Na_2CO_3$=99:1 (molar ratio)) having a total alkali concentration of 3.0 N were continuously added under agitation to carry out a continuous stirred tank reaction at a temperature of 40° C. for a residence time of 15 minutes. 2.30 L out of about 13 L of the obtained reaction slurry was filtered, and the filtrate was let pass through 2 L of water to be cleaned, dehydrated and dried at 105° C. by a shelf type drier for 16 hours. The dried product was ground in a mortar and let pass through a metal net having an opening of 150 μm to obtain 98 g of a white powder having a BET specific surface area of 85 $m^2/g$. The obtained magnesium hydroxide particle was a particle of the formula (1) in which x is 0.045 and m is 0.11. The obtained magnesium hydroxide contained $SO_4^-$ and $Cl^-$ ions as impurities derived from the bittern.

Example 2

Alkali Cleaning 2.30 L of the reaction slurry in Example 1 was filtered, and the filtrate was let pass through 1 L of water, 2 L of a sodium carbonate diluted aqueous solution having a concentration of 0.02 mol/L and 1 L of water to be cleaned, dehydrated and dried at 105° C. by a shelf type drier for 16 hours. The dried product was ground in a mortar and let pass through a metal net having an opening of 150 μm to obtain 97 g of a white powder having a BET specific surface area of 90 $m^2/g$.

Example 3

6.67 L of bittern refined by removing Ca and having a concentration of 1.5 mol/L and 6.40 L of an alkali mixed solution of caustic soda and sodium carbonate ($2NaOH:Na_2CO_3$=98:2 (molar ratio)) having a total alkali concentration of 3.0 N were continuously added to carry out a continuous stirred tank reaction at a temperature of 40° C. for a residence time of 15 minutes under agitation. 2.30 L out of about 13 L of the obtained reaction slurry was filtered, and the filtrate was let pass through 2 L of water to be cleaned, dehydrated and dried at 105° C. by a shelf type drier for 16 hours. The dried product was ground in a mortar and let pass through a metal net having an opening of 150 μm to obtain 97 g of a white powder having a BET specific surface area of 115 $m^2/g$.

Example 4

Alkali Cleaning 2.30 L of the reaction slurry in Example 3 was filtered, and the filtrate was let pass through 1 L of water, 2 L of a sodium carbonate diluted aqueous solution having a concentration of 0.02 mol/L and 1 L of water to be cleaned, dehydrated and dried at 105° C. by a shelf type drier for 16 hours. The dried product was ground in a mortar and let pass through a metal net having an opening of 150 μm to obtain 99 g of a white powder having a BET specific surface area of 123 m²/g.

Example 5

6.67 L of bittern refined by removing Ca and having a concentration of 1.5 mol/L and 2.95 L of an alkali mixed solution of caustic soda and sodium carbonate ($2NaOH:Na_2CO_3=94:6$ (molar ratio)) having a total alkali concentration of 6.5 N were continuously added to carry out a continuous stirred tank reaction at a temperature of 40° C. for a residence time of 15 minutes under agitation. 1.80 L out of about 9.5 L of the obtained reaction slurry was filtered, and the filtrate was let pass through 2 L of water to be cleaned, dehydrated and dried at 105° C. by a shelf type drier for 16 hours. The dried product was ground in a mortar and let pass through a metal net having an opening of 150 μm to obtain 97 g of a white powder having a BET specific surface area of 197 m²/g.

Example 6

Alkali Cleaning 1.80 L of the reaction slurry in Example 5 was filtered, and the filtrate was let pass through 1 L of water, 2 L of a caustic soda diluted aqueous solution having a concentration of 0.04 mol/L and 1 L of water to be cleaned, dehydrated and dried at 105° C. by a shelf type drier for 16 hours. The dried product was ground in a mortar and let pass through a metal net having an opening of 150 μm to obtain 96 g of a white powder having a BET specific surface area of 177 m²/g.

Example 7

Alkali Cleaning 1.80 L of the reaction slurry in Example 5 was filtered, and the filtrate was let pass through 1 L of water, 2 L of a sodium carbonate diluted aqueous solution having a concentration of 0.02 mol/L and 1 L of water to be cleaned, dehydrated and dried at 105° C. by a shelf type drier for 16 hours. The dried product was ground in a mortar and let pass through a metal net having an opening of 150 μm to obtain 98 g of a white powder having a BET specific surface area of 197 m²/g.

Example 8

1.2 L of an aqueous solution of magnesium sulfate having a concentration of 1.5 mol/L was heated up to 40° C., and 1.13 L of an alkali mixed solution of caustic soda and sodium carbonate ($2NaOH:Na_2CO_3=90:10$ (molar ratio)) having a total alkali concentration of 3.0 N was added to the above aqueous solution under agitation to carry out a batch reaction at a temperature of 40° C. for 30 minutes. 1.0 L out of about 2.3 L of the obtained reaction slurry was filtered, and the filtrate was let pass through 1 L of water to be cleaned, dehydrated and dried at 105° C. by a shelf type drier for 16 hours. The dried product was ground in a mortar and let pass through a metal net having an opening of 150 μm to obtain 46 g of a white powder having a BET specific surface area of 229 m²/g.

Example 9

Alkali Cleaning 1.0 L of the reaction slurry in Example 8 was filtered, and the filtrate was let pass through 0.5 L of water, 1 L of a caustic soda diluted aqueous solution having a concentration of 0.04 mol/L and 0.5 L of water to be cleaned, dehydrated and dried at 105° C. by a shelf type drier for 16 hours. The dried product was ground in a mortar and let pass through a metal net having an opening of 150 μm to obtain 46 g of a white powder having a BET specific surface area of 216 m²/g.

Example 10

6.67 L of an aqueous solution of magnesium sulfate having a concentration of 1.5 mol/L and 17.0 L of an alkali mixed solution of caustic soda and sodium carbonate ($2NaOH:Na_2CO_3=90:10$ (molar ratio)) having a total alkali concentration of 1.0 N were continuously added under agitation to carry out a continuous stirred tank reaction at a temperature of 25° C. for a residence time of 8 minutes. 4.65 L out of about 23.5 L of the obtained reaction slurry was filtered, and the filtrate was let pass through 2 L of water to be cleaned, dehydrated and dried at 105° C. by a shelf type drier for 16 hours. The dried product was ground in a mortar and let pass through a metal net having an opening of 150 μm to obtain 100 g of a white powder having a BET specific surface area of 256 m²/g.

Example 11

Alkali Cleaning 4.65 L of the reaction slurry in Example 10 was filtered, and the filtrate was let pass through 1 L of water, 2 L of a sodium carbonate diluted aqueous solution having a concentration of 0.02 mol/L and 1 L of water to be cleaned, dehydrated and dried at 105° C. by a shelf type drier for 16 hours. The dried product was ground in a mortar and let pass through a metal net having an opening of 150 μm to obtain 100 g of a white powder having a BET specific surface area of 249 m²/g.

Example 12

Alkali Cleaning 6.67 L of an aqueous solution of magnesium acetate having a concentration of 1.5 mol/L and 18.0 L of an alkali mixed solution of caustic soda and sodium carbonate ($2NaOH:Na_2CO_3=90:10$ (molar ratio)) having a total alkali concentration of 1.0 N were continuously added under agitation to carry out a continuous stirred tank reaction at a temperature of 25° C. for a residence time of 8 minutes. 4.55 L out of about 24.5 L of the obtained reaction slurry was filtered, and the filtrate was let pass through 1 L of water to be cleaned, 2 L of a sodium carbonate diluted aqueous solution having a concentration of 0.02 mol/L and 1 L of water to be cleaned, dehydrated and dried at 105° C. by a shelf type drier for 16 hours. The dried product was ground in a mortar and let pass through a metal net having an opening of 150 μm to obtain 97 g of a white powder having a BET specific surface area of 251 m²/g.

Example 13

Baked Product

The magnesium hydroxide having a BET specific surface area of 249 m²/g of Example 11 was baked at 400° C. for 2 hours.

Example 14

Baked Product

The magnesium hydroxide having a BET specific surface area of 177 m²/g of Example 6 was baked at 750° C. for 2 hours.

Comparative Example 1

6.67 L of bittern refined by removing Ca and having a concentration of 1.5 mol/L and 2.95 L of caustic soda having a total alkali concentration of 6.5 N were continuously added under agitation to carry out a continuous stirred tank reaction at a temperature of 40° C. for a residence time of 15 minutes. 1.80 L out of about 9.5 L of the obtained reaction slurry was filtered, and the filtrate was let pass through 2 L of water to be cleaned, dehydrated and dried at 105° C. by a shelf type drier for 16 hours. The dried product was ground in a mortar and let pass through a metal net having an opening of 150 μm to obtain 98 g of a white powder having a BET specific surface area of 40 m²/g.

Comparative Example 2

The Kisuma SD magnesium hydroxide of Kyowa Chemical Industry Co., Ltd. was used. It had a BET specific surface area of 37 m²/g.

Comparative Example 3

The Kisuma F magnesium hydroxide of Kyowa Chemical Industry Co., Ltd. was used. It had a BET specific surface area of 58 m²/g.

Comparative Example 4

The Keta soft basic magnesium carbonate of Kyowa Chemical Industry Co., Ltd. was used. It had a BET specific surface area of 26 m²/g.

Comparative Example 5

Baked Product

The magnesium hydroxide having a BET specific surface area of 37 m²/g of Comparative Example 2 was baked at 400° C. for 2 hours.

Comparative Example 6

Baked Product

The magnesium hydroxide having a BET specific surface area of 58 m²/g of Comparative Example 3 was baked at 400° C. for 2 hours.

Comparative Example 7

Baked Product

The magnesium hydroxide having a BET specific surface area of 58 m²/g of Comparative Example 3 was baked at 750° C. for 2 hours.

Figure 2:
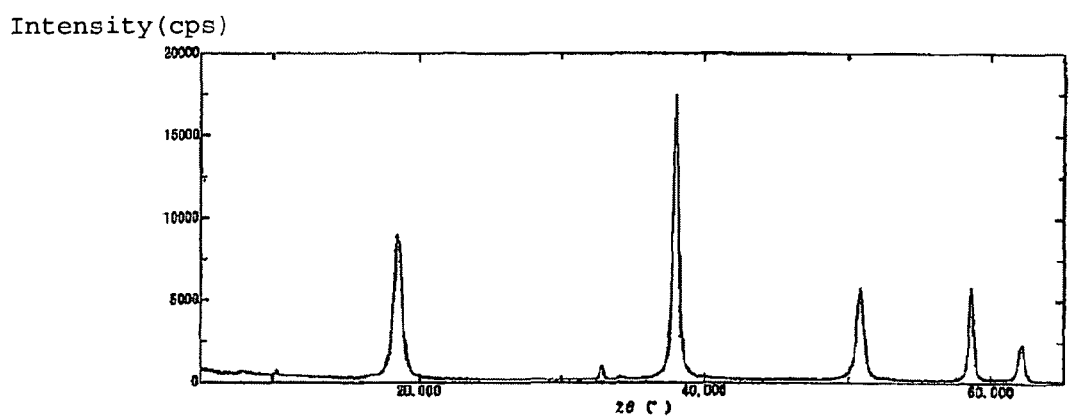
FIG. 2 is an X-ray diffraction image of a magnesium hydroxide particle obtained in Comparative Example 1.
Figure 3:
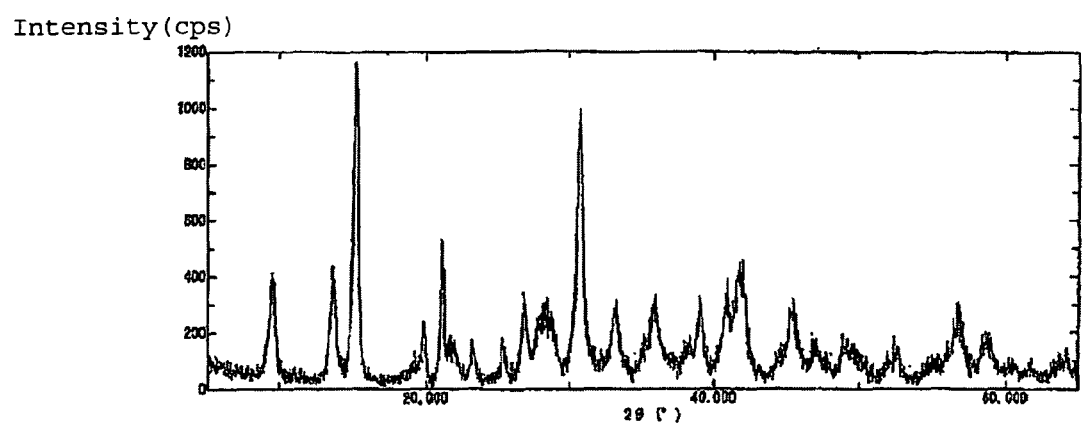
FIG. 3 is an X-ray diffraction image of a basic magnesium carbonate particle obtained in Comparative Example 4.
Figure 4:
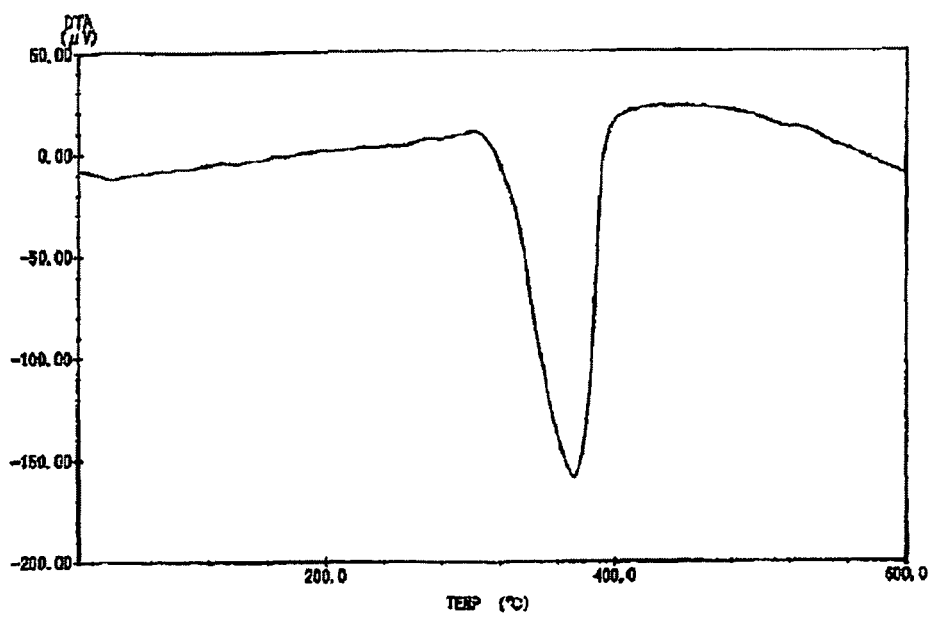
FIG. 4 is a differential thermal analysis curve (DTA) of a magnesium hydroxide particle obtained in Example 6.
Figure 5:
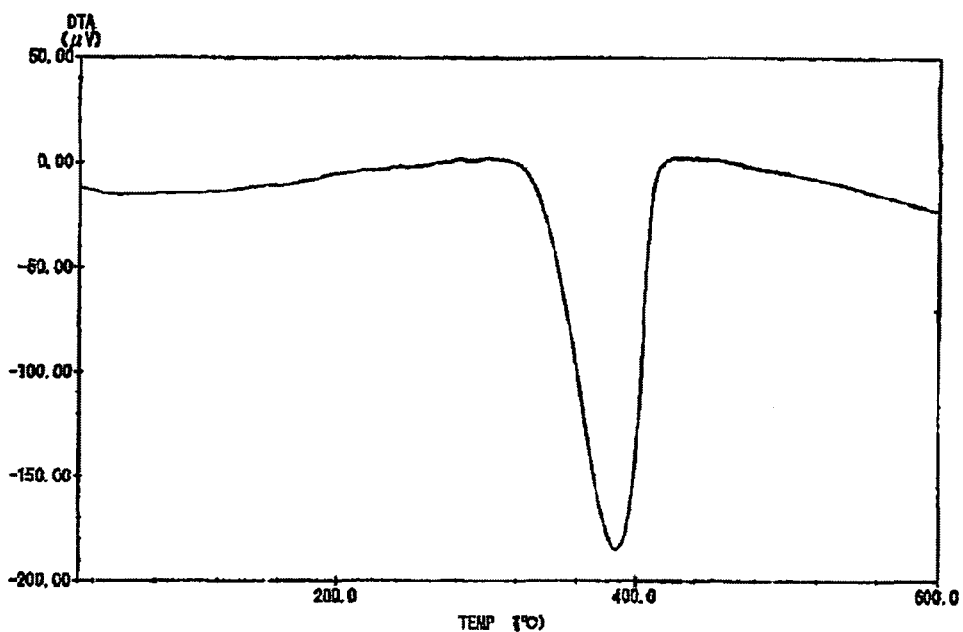
FIG. 5 is a differential thermal analysis curve (DTA) of a magnesium hydroxide particle obtained in Comparative Example 3.
Figure 6:
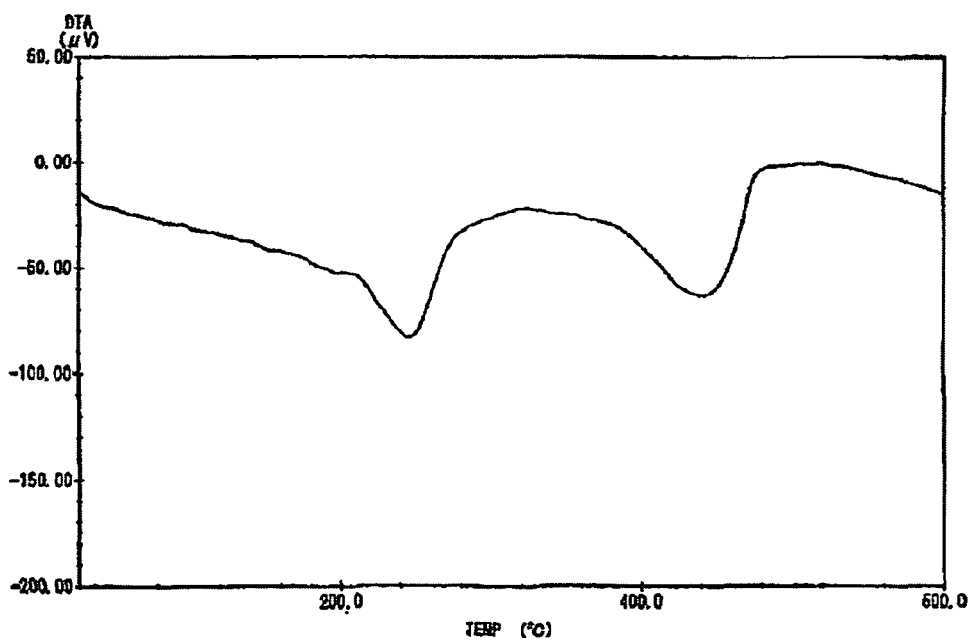
FIG. 6 is a differential thermal analysis curve (DTA) of a basic magnesium carbonate particle obtained in Comparative Example 4.

Examples 1 to 14 and Comparative Examples 1 to 7 were analyzed by the following method. The results of composition analysis and the measurement results of the BET specific surface areas of these are shown in Table 1, the results of structural analysis by an X-ray diffraction apparatus are shown in FIGS. 1 to 3, and thermal analysis curves by a differential thermobalance are shown in FIGS. 4 to 6.

(1) carbonate ($CO_2$); JIS R9101 sodium hydroxide solution-hydrochloric acid titration method
(2) sulfate ($SO_4$), chloride (Cl); fluorescent X-ray analyzing apparatus (Rigaku RIX2000)
(3) BET specific surface area; liquid nitrogen adsorption apparatus (Yuasa Ionics NOVA2000)
(4) X-ray structural analysis; automatic X-ray diffraction apparatus (Rigaku RINT2200V)
(5) Thermal analysis; differential thermobalance (BRUKER AXS TG-DTA2000SA)

TABLE 1

|  | Alkali cleaning | Baking temperature (° C.) | x in formula (1) | $CO_2$ (wt %) | $SO_4$ (wt %) | Cl (wt %) | BET (m²/g) |
|---|---|---|---|---|---|---|---|
| Ex. 1 | not done |  | 0.045 | 1.69 | 0.643 | 0.201 | 85 |
| Ex. 2 | done ($Na_2CO_3$) |  | 0.052 | 1.95 | 0.243 | 0.078 | 90 |
| Ex. 3 | not done |  | 0.062 | 2.32 | 0.575 | 0.208 | 115 |
| Ex. 4 | done ($Na_2CO_3$) |  | 0.075 | 2.80 | 0.196 | 0.080 | 123 |
| Ex. 5 | not done |  | 0.123 | 4.50 | 0.477 | 0.139 | 197 |
| Ex. 6 | done (NaOH) |  | 0.103 | 3.80 | 0.092 | 0.031 | 177 |
| Ex. 7 | done ($Na_2CO_3$) |  | 0.139 | 5.10 | 0.100 | 0.037 | 197 |
| Ex. 8 | not done |  | 0.194 | 7.00 | 1.358 | 0.010 | 229 |
| Ex. 9 | done (NaOH) |  | 0.166 | 6.04 | 0.249 | 0.002 | 216 |
| Ex. 10 | not done |  | 0.194 | 7.00 | 1.360 | 0.002 | 256 |
| Ex. 11 | done ($Na_2CO_3$) |  | 0.217 | 7.80 | 0.287 | 0.001 | 249 |
| Ex. 12 | done ($Na_2CO_3$) |  | 0.205 | 7.40 | 0.010 | 0.002 | 251 |
| Ex. 13 | done ($Na_2CO_3$) | 400 |  |  |  |  | 282 |
| Ex. 14 | done (NaOH) | 750 |  |  |  |  | 71 |
| C. Ex. 1 | not done |  | 0.010 | 0.37 | 0.790 | 0.156 | 40 |
| C. Ex. 2 | not done |  |  |  | 0.059 | 0.333 | 37 |
| C. Ex. 3 | not done |  |  |  | 0.640 | 0.051 | 58 |
| C. Ex. 4 | not done |  | 1.088 | 33.05 | 0.020 | 0.016 | 26 |
| C. Ex. 5 | not done | 400 |  |  |  |  | 52 |
| C. Ex. 6 | not done | 400 |  |  |  |  | 205 |
| C. Ex. 7 | not done | 750 |  |  |  |  | 49 |

Ex.: Example C. Ex.: Comparative Example

Effect of the Invention

The magnesium hydroxide particle of the present invention has a large BET specific surface area. According to the manufacturing method of the present invention, a magnesium hydroxide particle having a large BET specific surface area can be manufactured. Magnesium oxide (baked product) obtained by baking the magnesium hydroxide particle of the present invention has a large BET specific surface area.

INDUSTRIAL APPLICABILITY

The magnesium hydroxide particle of the present invention has a much larger BET specific surface area than conventional magnesium hydroxide and basic magnesium carbonate. Therefore, it is expected to be used for various purposes, for example, not only as an adsorbent and neutralizer but also as a filler, ceramic raw material, food additive and antiacid. Since magnesium oxide obtained by baking the magnesium hydroxide particle of the present invention which has a reduced content of Cl by cleaning with an alkali diluted aqueous solution has a larger BET specific surface area than magnesium oxide obtained by baking conventional magnesium hydroxide, it is expected to be used for various purposes.

The invention claimed is:

1. A magnesium hydroxide particle having a BET specific surface area of 100 to 400 m$^2$/g and represented by the following formula (1):

$$Mg(OH)_{2-x}(CO_3)_{0.5x} \cdot mH_2O \qquad (1)$$

wherein x and m satisfy the following conditions:

$0.06 \leq x \leq 0.3$, $0 \leq m \leq 1$, and wherein the magnesium hydroxide particle is produced by contacting an Mg ion to an OH ion in water in the presence of a $CO_3$ ion in a molar ratio of $2(OH):CO_3 = 98:2$ to $75:25$.

2. The magnesium hydroxide particle according to claim 1 which has a BET specific surface area of 100 to 350 m$^2$/g.

3. The magnesium hydroxide particle according to claim 1, which has a same X-ray diffraction image and differential thermal analysis (DTA) as $Mg(OH)_2$.

4. The magnesium hydroxide particle according to claim 1, wherein the Mg ion is derived from magnesium chloride, magnesium sulfate, magnesium nitrate or magnesium acetate.

5. The magnesium hydroxide particle according to claim 1, wherein the OH ion is derived from an alkali metal hydroxide or ammonium hydroxide.

6. The magnesium hydroxide particle according to claim 1, wherein the $CO_3$ ion is derived from an alkali metal carbonate or ammonium carbonate.

* * * * *